US012597177B2

(12) United States Patent  
Brown et al.

(10) Patent No.: US 12,597,177 B2  
(45) Date of Patent: Apr. 7, 2026

(54) CHANGING DISPLAY RENDERING MODES BASED ON MULTIPLE REGIONS

(71) Applicant: Apple Inc., Cupertino, CA (US)

(72) Inventors: Travis W. Brown, Boulder, CO (US); Geoffrey Stahl, San Jose, CA (US); Thomas Post, San Mateo, CA (US); Osiris I. Perez Ojeda, Altadena, CA (US)

(73) Assignee: APPLE INC., Cupertino, CA (US)

( * ) Notice: Subject to any disclaimer, the term of this patent is extended or adjusted under 35 U.S.C. 154(b) by 140 days.

(21) Appl. No.: 18/197,959

(22) Filed: May 16, 2023

(65) Prior Publication Data

US 2023/0368435 A1 Nov. 16, 2023

Related U.S. Application Data

(60) Provisional application No. 63/342,279, filed on May 16, 2022.

(51) Int. Cl.  
G06T 11/00 (2006.01)  
G06F 3/048 (2013.01)  
(Continued)

(52) U.S. Cl.  
CPC ............... G06T 11/10 (2026.01); G06T 7/90 (2017.01); *G06T 2207/10024* (2013.01)

(58) Field of Classification Search  
CPC ......... G06T 11/001; G06T 11/60; G06T 7/90; G06T 2207/10024; G06T 2200/24; G06T 13/00; G06T 13/80; G06T 2210/00; G06T 2210/52; G09G 5/02; G09G 5/06; G09G 5/10; G09G 5/37; G09G 2320/066; G09G 2320/0626; G09G 2320/0686; G09G 2354/00; G09G 2330/021; G09G 2360/144; G09G 5/30; G09G 3/36; G06F 3/0481–0488; G06F 3/04886; (Continued)

(56) References Cited

U.S. PATENT DOCUMENTS 10,140,774 B2 11/2018 Gorumkonda  
10,885,676 B2 1/2021 Chaudhari et al.  
(Continued)

*Primary Examiner* — Wesner Sajous  
(74) *Attorney, Agent, or Firm* — Fernando & Partners, LLP

(57) ABSTRACT

A method includes obtaining computer-generated content associated with a first color characteristic. The computer-generated content is associated with a first region of a physical environment. The method includes detecting a second color characteristic associated with a second region of the physical environment different from the first region of the physical environment. The method includes, while the electronic device is in a first display rendering mode including the first and second color characteristics, determining that a display rendering mode change condition is satisfied, and accordingly changing the electronic device from the first display rendering mode to a second display rendering mode. Changing to the second display rendering mode includes changing the first region from the first color characteristic to a third color characteristic, or changing the second region from the second color characteristic to a fourth color characteristic different from the third color characteristic.

23 Claims, 14 Drawing Sheets

(51) Int. Cl.

| | |
|---|---|
| *G06T 7/90* | (2017.01) |
| *G06T 11/10* | (2026.01) |
| *G09G 5/02* | (2006.01) |
| *G09G 5/10* | (2006.01) |
| *G09G 5/37* | (2006.01) |
| *H04N 1/60* | (2006.01) |
| *H04N 5/202* | (2023.01) |
| *H04N 5/57* | (2006.01) |
| *H04N 9/64* | (2023.01) |
| *H04N 9/69* | (2023.01) |
| *H04N 9/77* | (2006.01) |

(58) Field of Classification Search
CPC .... G06F 3/016; G06F 11/3072; G06F 40/279;
G06F 21/36; G06F 2221/2149; H04N
1/58; H04N 1/6058; H04N 5/57–58;
H04N 9/64–77; H04N 5/202
See application file for complete search history.

(56) References Cited

U.S. PATENT DOCUMENTS

| | | | |
|---|---|---|---|
| 10,937,199 B2 | 3/2021 | Smith et al. | |
| 12,118,192 B2 * | 10/2024 | Stack | G06F 11/3072 |
| 2021/0004996 A1 | 1/2021 | Murillo et al. | |
| 2023/0367460 A1 * | 11/2023 | Clarke | G06F 3/04886 |
| 2023/0367467 A1 * | 11/2023 | Clarke | G06F 3/04886 |
| 2023/0367470 A1 * | 11/2023 | Clarke | H04M 1/724634 |
| 2023/0367472 A1 * | 11/2023 | Clarke | H04M 1/72484 |
| 2023/0368750 A1 * | 11/2023 | Stack | G06F 3/0482 |
| 2024/0143147 A1 * | 5/2024 | Clarke | G06F 3/04883 |

* cited by examiner

101 - Reminder to buy eggs and milk

102 - Reminder to drink more water

103 - Reminder to exercise more

Computer-generated content 100

104

500

CHANGING DISPLAY RENDERING MODES BASED ON MULTIPLE REGIONS

CROSS-REFERENCE TO RELATED APPLICATIONS

This application claims the benefit of U.S. Provisional Patent App. No. 63/342,279, filed on May 16, 2022, which is incorporated by reference in its entirety.

TECHNICAL FIELD

The present disclosure relates to display rendering modes, and in particular changing the display rendering modes.

BACKGROUND

In various circumstances, a device displays an environment including a physical (e.g., real world) element and a computer-generated element. Each of the physical element and the computer-generated element is associated with a respective color characteristic, such as chromaticity or luminance. The respective color characteristics often differ from each other in a way that prevents an immersive user experience or otherwise degrades the user experience. However, previously available display techniques do not account for the respective color characteristics.

SUMMARY

In accordance with some implementations, a method is performed at an electronic device including one or more processors, a non-transitory memory, and a display. The method includes obtaining computer-generated content associated with a first color characteristic. The computer-generated content is associated with a first region of a physical environment. The method includes detecting a second color characteristic associated with a second region of the physical environment different from the first region of the physical environment. The method includes, while the electronic device is in a first display rendering mode including the first and second color characteristics, determining that a display rendering mode change condition is satisfied. In response to determining that the display rendering mode change condition is satisfied, the method includes changing the electronic device from the first display rendering mode to a second display rendering mode. Changing to the second display rendering mode includes changing, on the display, the first region from the first color characteristic to a third color characteristic, or changing, on the display, the second region from the second color characteristic to a fourth color characteristic different from the third color characteristic.

In accordance with some implementations, a method is performed at an electronic device including one or more processors, a non-transitory memory, and a display. The one or more programs are stored in the non-transitory memory and configured to be executed by the one or more processors and the one or more programs include instructions for performing or causing performance of the operations of any of the methods described herein. In accordance with some implementations, a non-transitory computer readable storage medium has stored therein instructions which when executed by one or more processors of an electronic device, cause the device to perform or cause performance of the operations of any of the methods described herein. In accordance with some implementations, an electronic device includes means for performing or causing performance of the operations of any of the methods described herein. In accordance with some implementations, an information processing apparatus, for use in an electronic device, includes means for performing or causing performance of the operations of any of the methods described herein.

BRIEF DESCRIPTION OF THE DRAWINGS

For a better understanding of the various described implementations, reference should be made to the Description, below, in conjunction with the following drawings in which like reference numerals refer to corresponding parts throughout the figures.

DESCRIPTION

Figure 1A:
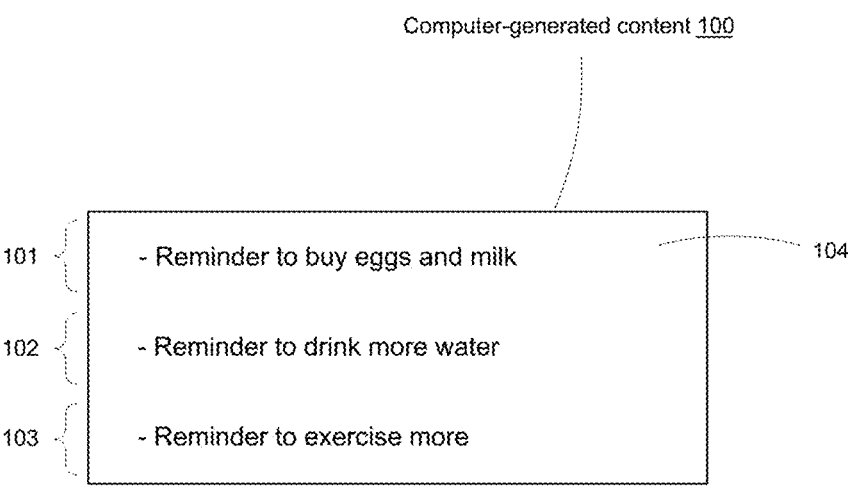
FIGS. 1A-1E are a first example of changing display rendering modes in accordance with some implementations.

In various circumstances, a device may concurrently display a physical (e.g., real-world) element and a computer-generated element. For example, in augmented reality (AR) the device displays a computer-generated lamp so as to appear sitting on a physical table. Each of the physical element and the computer-generated element is associated with a respective color characteristic, such as chromaticity, luminance, or white point. Respective color characteristics of the physical element and the computer-generated element often perceptually conflict with each other, resulting in a degraded user experience. For example, when ambient light from a physical environment is relatively bright (e.g., high luminance), the viewing quality of a video stream is degraded by the brightness of the ambient light. As another example, ambient light from a physical environment has a color characteristic that degrades the user experience. However, previously available techniques do not effectively adjust the respective color characteristics in order to account for the brightness or color characteristic of the ambient light. As another example, movement of a device within a physical environment results in changes of the color characteristics of the ambient light and/or the viewability of the computer-generated element. However, previously available display techniques do not effectively adjust the respective color characteristics, and thus fail to provide an immersive user experience.

By contrast, various implementations disclosed herein include methods, systems, and devices for changing display rendering modes based on multiple regions of a physical environment. To that end, a method includes obtaining computer-generated content that is associated with a first color characteristic. The computer-generated content is associated with a first region of a physical environment. The method includes detecting a second color characteristic associated with a second region of the physical environment, which is different from the first region. For example, the second region surrounds (e.g., borders) the first region.

Moreover, the method includes, while the electronic device is in a first display rendering mode including the first and second color characteristics, determining that a display rendering mode change condition is satisfied. For example, the display rendering mode change condition is satisfied based on a user input requesting to display the computer-generated content. As another example, the display rendering mode change condition is satisfied based on a positional change of an electronic device that results in the field of view of the electronic device including the first and second regions. In response to determining that the display rendering mode change condition is satisfied, the method includes changing the electronic device from the first display rendering mode to a second display rendering mode.

For example, in cases where the computer-generated content should be integrated in the physical environment, changing to the second display rendering mode includes changing the first region from the first color characteristic to a third color characteristic, wherein the third color characteristic is based at least in part on the second color characteristic. For example, the computer-generated content is color adjusted to mix with color characteristics of the surrounding physical environment.

As another example, in cases where the first color characteristic of the computer-generated content should be preserved, changing to the second display rendering mode includes changing the second region from the second color characteristic to a fourth color characteristic. The fourth color characteristic is different from the third color characteristic. For example, the area surrounding the first region is color adjusted to have a neutral tone, thereby reducing user distractions from the computer-generated content (displayed at the first region).

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described implementations. The first contact and the second contact are both contacts, but they are not the same contact, unless the context clearly indicates otherwise.

The terminology used in the description of the various described implementations herein is for the purpose of describing particular implementations only and is not intended to be limiting. As used in the description of the various described implementations and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting", depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]", depending on the context.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIGS. 1A-1E are a first example of changing display rendering modes in accordance with some implementations.

According to various implementations disclosed herein, an electronic device 120 obtains computer-generated content that is associated with a first color characteristic. For example, a particular color characteristic indicates chromaticity, chroma, luminance, white point (e.g., D65), and/or the like. With reference to FIG. 1A, the computer-generated content 100 includes a list of textual content within a user interface (e.g., an application window for a notes application). The list of textual content includes first text 101 ("—Reminder to buy eggs and milk"), second text 102 ("—Reminder to drink more water"), and third text 103 ("—Reminder to exercise more"). The user interface has a white background in order to make the textual content easily visible. Accordingly, in this example, the first color characteristic 104 is white.

Figure 1B:
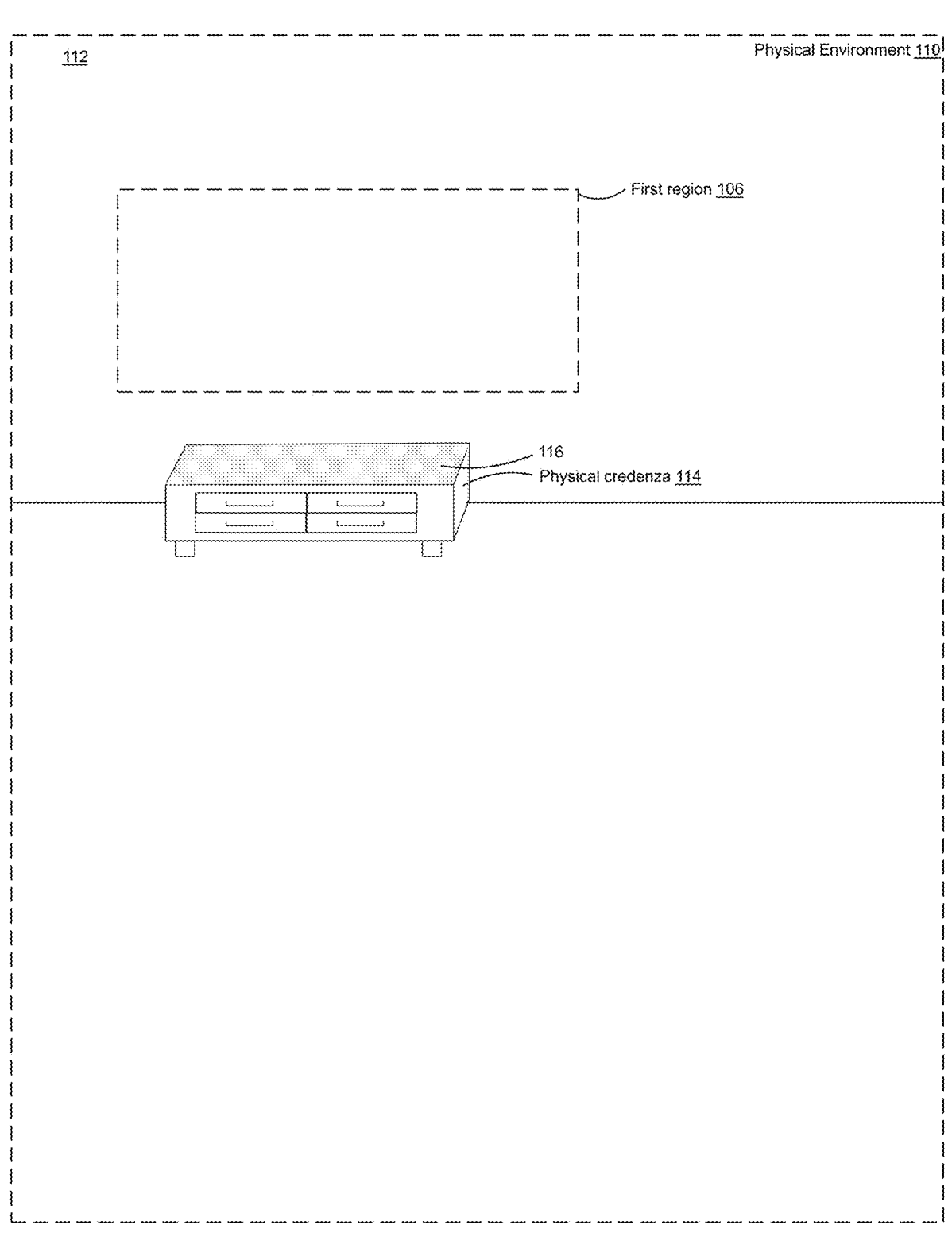

The computer-generated content 100 is associated with a first region of a physical environment. For example, the first region corresponds to a display location of the computer-generated content within the physical environment. As one example, as illustrated in FIG. 1B, the computer-generated content 100 is associated with a first region 106. The first region 106 corresponds to a rectangular portion of a physical wall 112 of a physical environment 110. The first region 106 may be designated in a variety of ways, such as via user input or independent of user input—e.g., default position of the first region 106 is near the middle of a display of the electronic device 120.

As further illustrated in FIG. 1B, the physical environment 110 also includes a physical credenza 114 sitting along the physical wall 112. The physical credenza 114 is associated with a second color characteristic 116, which corresponds to a red color. The red color is indicated by the surface of the physical credenza 114 having a first hatch pattern, as illustrated in FIGS. 1B-1E. Accordingly, in this example, the first color characteristic 104 (white) is different from the second color characteristic 116 (red).

Figure 1C:
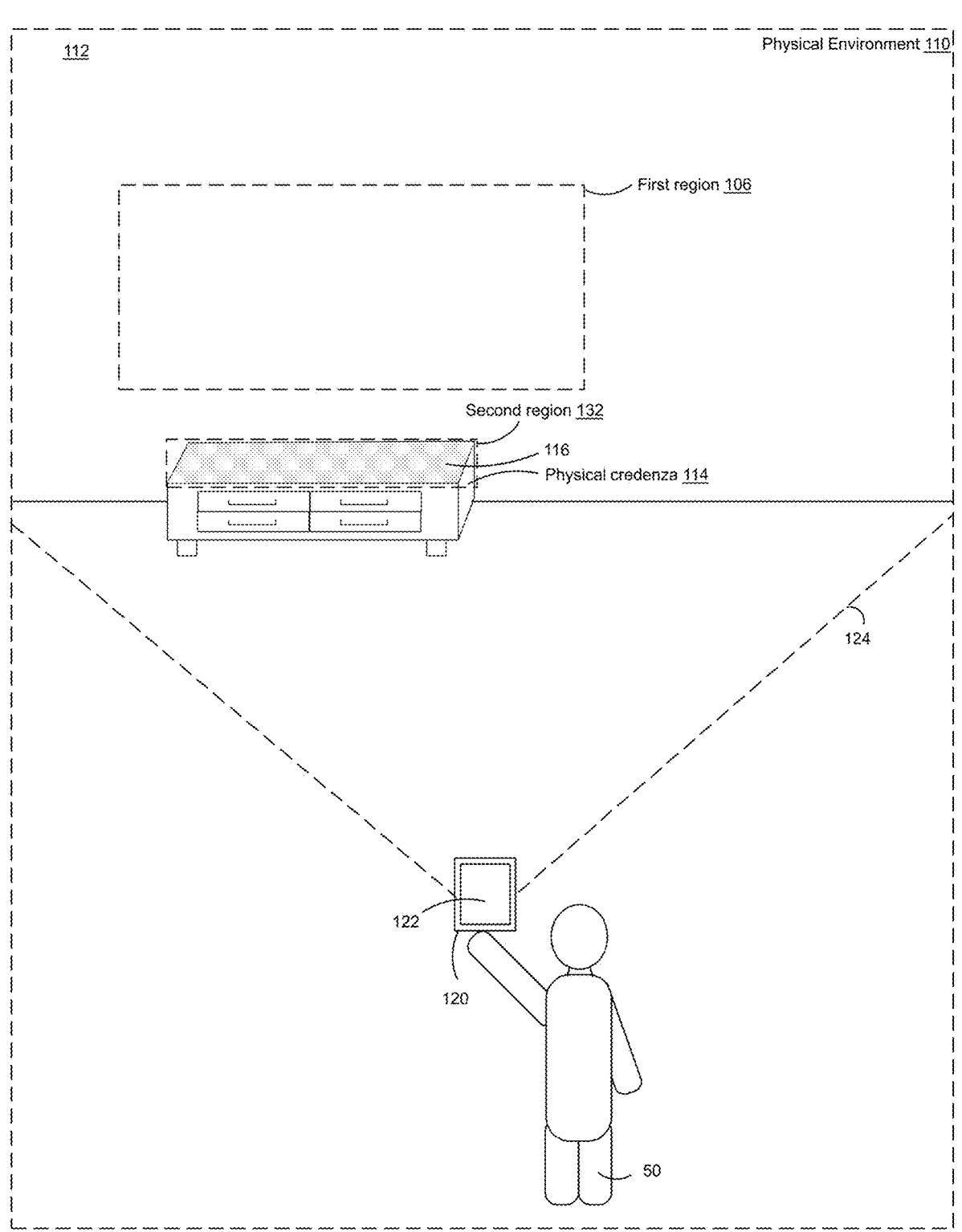

As illustrated in FIG. 1C, a user 50 holds an electronic device 120 in the physical environment 110. For example, the electronic device 120 corresponds to a mobile device, such as a smartphone, tablet, etc.

In some implementations, the electronic device 120 corresponds to a head-mountable device (HMD) that includes an integrated display (e.g., a built-in display). In some implementations, the electronic device 120 includes a head-mountable enclosure. In various implementations, the head-mountable enclosure includes an attachment region to which another device with a display can be attached. In various implementations, the head-mountable enclosure is shaped to form a receptacle for receiving another device that includes a display (e.g., the electronic device 120). For example, in some implementations, the electronic device 120 slides/snaps into or otherwise attaches to the head-mountable enclosure.

The electronic device 120 includes a display 122. The display 122 is associated with a viewable region 124 that includes a portion of a physical environment 110. The portion of the physical environment 110 includes the physical credenza 114 and the physical wall 112, which includes the first region 106.

As further illustrated in FIG. 1C, in some implementations, the electronic device 120 determines a second region 132 of the physical environment 110. The second region 132 is different from (e.g., outside of) the first region 106. For example, the second region 132 may correspond to the surface of the physical credenza 114, as illustrated in FIG. 1C. Determining the second region 132 may include identifying, via computer vision, a physical object that is within the physical environment 110, and setting the second region 132 to the position of the physical object. To that end, in some implementations, the electronic device determines the second region 132 based on image data of the physical environment 110. For example, the electronic device 120 includes an image sensor that captures the image data (e.g., one or more images) of the physical environment 110. The image sensor may be associated with a field-of-view (FOV) that approximates the viewable region 124. In some implementations, the electronic device 120 identifies the surface of the physical credenza 114 because the surface of the physical credenza 114 satisfies a proximity threshold with respect to (e.g., less than a threshold distance from) the first region 106. In some implementations, the electronic device 120 identifies a subset of pixels of the image data that corresponds to the surface of the physical credenza 114. In some implementations, the electronic device 120 composites the image data with various computer-generated content in order to generate XR data that characterizes an XR environment.

Moreover, the electronic device 120 detects the second color characteristic 116 associated with the second region 132. Continuing with the previous example, the electronic device 120 determines the second color characteristic 116 based on respective pixel values associated with the subset of pixels, wherein the respective pixel values indicate the second color characteristic 116.

Figure 1D:
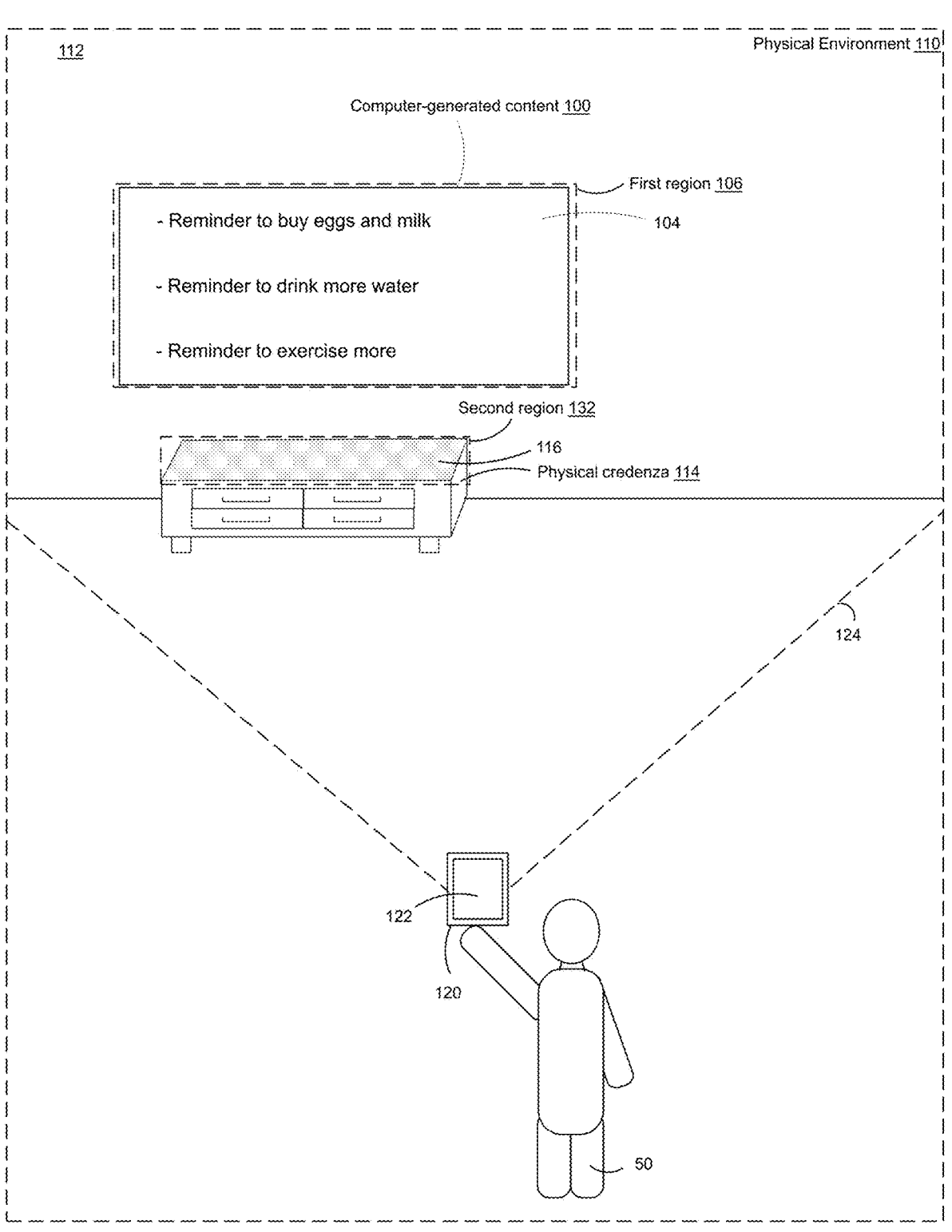

As illustrated in FIG. 1D, while the electronic device 120 is in a first display rendering mode, the electronic device 120 displays (e.g., concurrently) the computer-generated content 100 with the first color characteristic 104 at a portion of the display 122 corresponding to the first region 106, and the second color characteristic 116 at a portion of the display 122 corresponding to the second region 132.

According to various implementations, while the electronic device 120 is in the first display rendering mode including the first and second color characteristics, the electronic device 120 determines that a display rendering mode change condition is satisfied. For example, in some implementations, the electronic device 120 determines that the display rendering mode change condition is satisfied by detecting (e.g., via computer vision) that the first region 106 and the second region 132 are within the viewable region 124. As another example, in some implementations, the electronic device 120 determines that the display rendering mode change condition is satisfied by detecting a display request to display the computer-generated content 100. In some implementations, the electronic device 120 receives the display request from the user 50, via a user input. For example, the electronic device 120 performs eye tracking or extremity tracking of the user 50, and accordingly determines that the user's gaze or extremity is directed to a display request affordance (e.g., a displayed menu button).

Figure 1E:
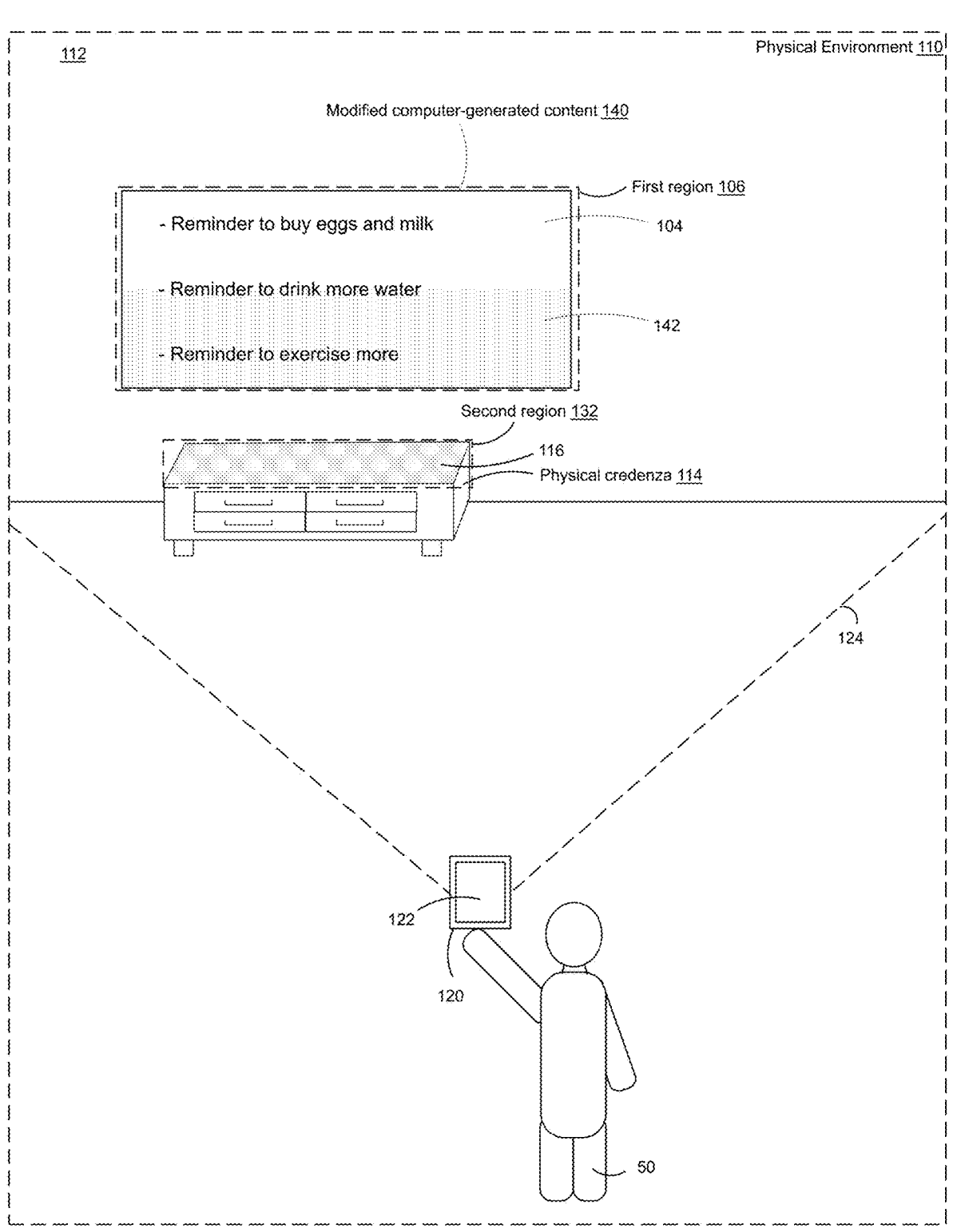

In response to determining that the display rendering mode change condition is satisfied, the electronic device 120 changes from the first display rendering mode to a second display rendering mode. Changing to the second display rendering mode includes, changing, on the display 122, the first region 106 from the first color characteristic 104 to a third color characteristic, and/or changing, on the display 122, the second region 132 from the second color characteristic 116 to a fourth color characteristic. The fourth color characteristic is different from the third color characteristic. For example, as illustrated in FIG. 1E, the electronic device 120 changes a portion of the first region 106 from the first color characteristic 104 to a third color characteristic 142. Namely, in some implementations, the electronic device 140 modifies the computer-generated content 100 such that at least a portion of the modified computer-generated content 140 has the third color characteristic 142. The third color characteristic 142 is indicated by a second hatch pattern in FIG. 1E. The third color characteristic 142 may be based on a color mixing of the first color characteristic 104 (white) with the second color characteristic 116 (red). For example, the third color characteristic 142 is pink. As another example, changing the second region 132 from the second color characteristic 116 to the fourth color characteristic includes increasing a luminance of the second region 132 based on the white color (the first color characteristic 104) of the computer-generated content 100. For example, the electronic device 120 renders image data of the second region 132 so as to increase the brightness of the second region 132. In some implementations, the brightness increase of the second region 132 is based on a gradient function. For example, the amount of brightness increase of the second region 132 is based on the gradient function, wherein the gradient function is based on the distance from the first region 106 (e.g., larger brightness increase for a portion of the second region 132 that is nearer to the first region 106).

In some implementations, a portion of the computer-generated content 100 is modified. For example, as illustrated in FIG. 1E, the bottom portion of the user interface is colored with the third color characteristic 142, whereas the upper portion of the user interface maintains the third color characteristic 104 (white). In this example, the bottom portion of the user interface is color adjusted from white to pink because the bottom portion is sufficiently close to the surface of the physical credenza 114. Moreover, the upper portion of the user interface is maintained at the first color characteristic 104 (white) because the upper portion is not sufficiently close to the surface of the physical credenza 114. In some implementations, the electronic device 120 may perform a weighted (e.g., gradient-based) color adjusting based on proximity to the second region 132, in order to determine the third color characteristic 142. For example, a gradient-based color adjustment results in the modified computer-generated content 140 including dark pink (closest to the physical credenza 114), medium pink, and light pink (farthest from the physical credenza 114). In some implementations, color adjusting the first region 106 includes changing a hue or luminance of the first region 106. One of ordinary skill in the art will appreciate that, in some implementations, the entirety of the first region 106 is color adjusted.

Accordingly, in some implementations, the electronic device 120 color adjusts computer-generated content, while preserving the color of a portion of a physical environment 110 (e.g., the portion surrounding the first region 106). Blending a color characteristic of the physical environment into displayed computer-generated content provides a user with a more immersive user experience, while preserving the color features of the physical environment avoids an undesirably intrusive user experience.

FIGS. 2A-2D are a second example of changing display rendering modes in accordance with some implementations. The second example described with reference to FIGS. 2A-2D also operates within the physical environment 110, including the physical wall 112 and the red physical credenza 114.

Figure 2A:
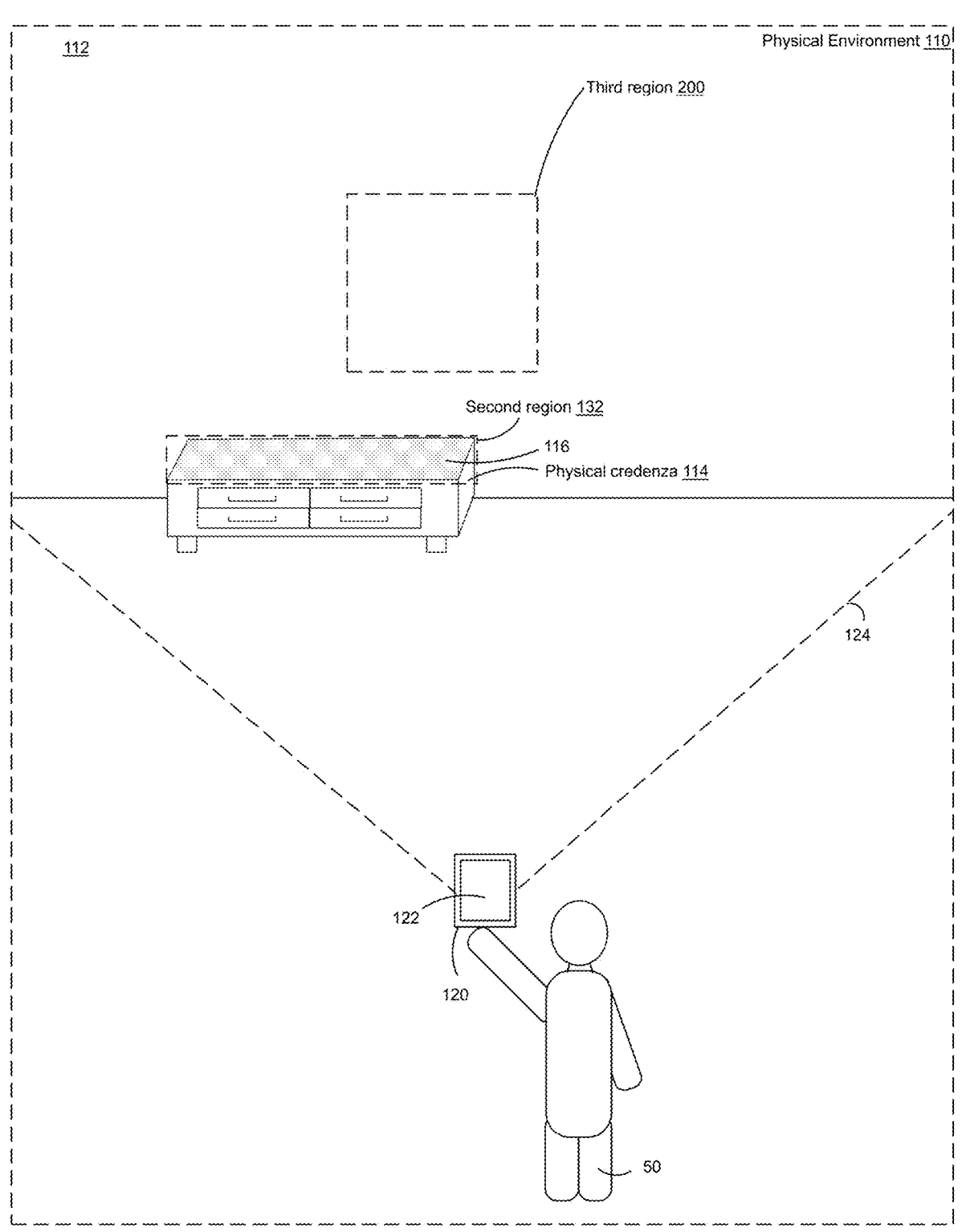
FIGS. 2A-2D are a second example of changing display rendering modes in accordance with some implementations.

The electronic device 120 obtains computer-generated content that corresponds to a drawing application user interface (UI) 204. As illustrated in FIG. 2A, the drawing application UI 204 is associated with a third region 200 of the physical environment 110.

Figure 2B:
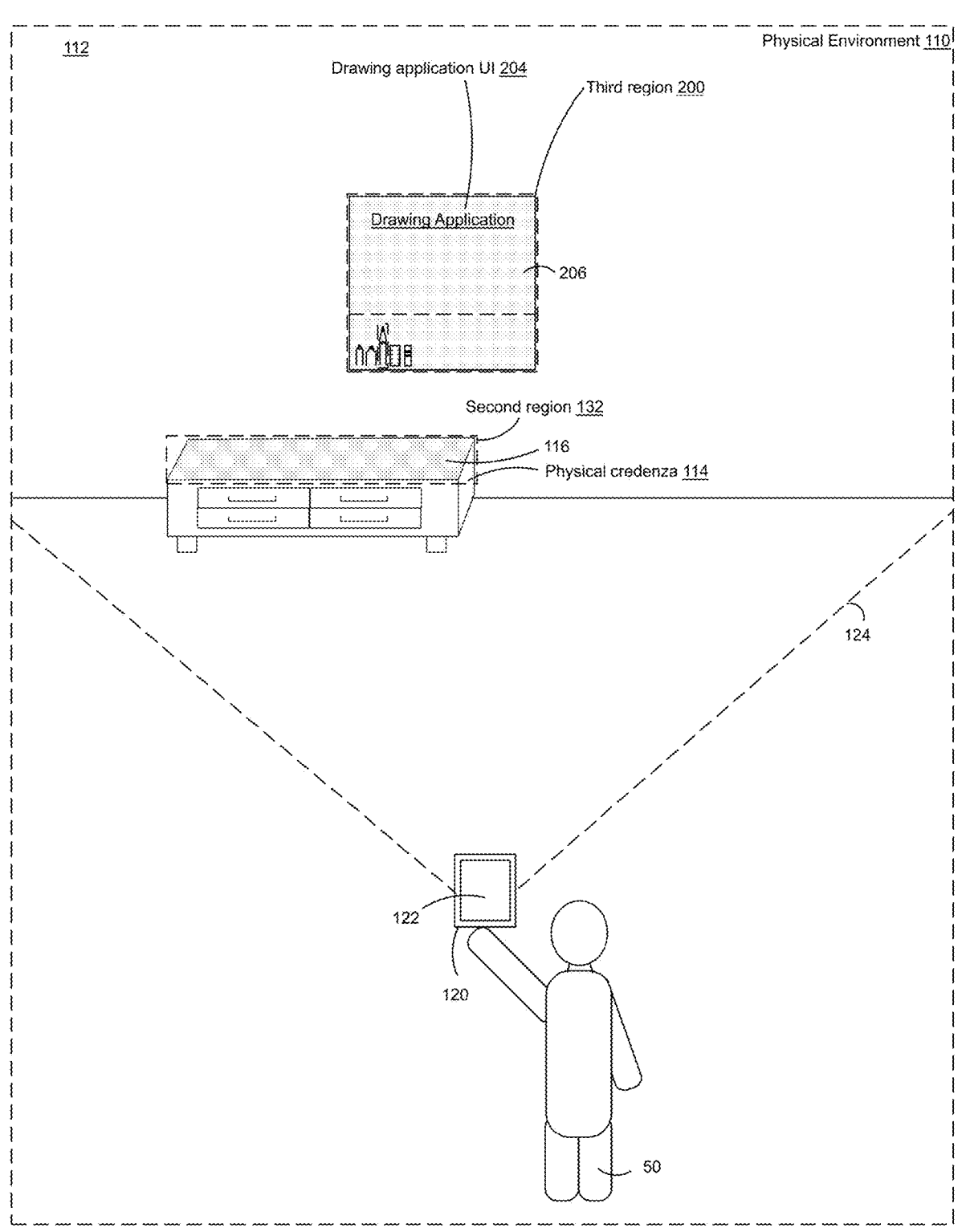

As illustrated in FIG. 2B, while the electronic device 120 is in a first display rendering mode, the electronic device 120 displays the drawing application UI 204 within the third region 200. The drawing application UI 204 is associated with a fifth color characteristic 206 including a white drawing canvas (area above the horizontal dotted line).

According to various implementations, while the electronic device 120 is in the first display rendering mode, the electronic device 120 determines a user engagement score with respect to the drawing application UI 204. The user engagement score characterizes a level of user engagement with respect to the drawing application UI 204. User engagement may be based on whether the user 50 focuses on the drawing application UI 204, and optionally how long the focus is directed to the drawing application UI 204.

In some implementations, the user engagement score is based on a gaze of one or more eyes of the user 50. To that end, in some implementations, the electronic device 120 includes an eye tracker that tracks the gaze of the eye(s). For example, the user engagement score increases as the gaze moves nearer to the drawing application UI 204. As another example, the user engagement score increases the longer the gaze is directed to within the drawing application UI 204.

In some implementations, the user engagement score is based on an extremity (e.g., hand or finger) of the user 50. To that end, in some implementations, the electronic device 120 includes an extremity tracker that tracks the extremity of the user 50. For example, the user engagement score increases when the extremity of the user 50 interacts with the drawing application UI 204, such as when the extremity selects a particular drawing tool affordance (e.g., the pencil) or when the extremity moves within the drawing canvas in order to perform a drawing operation. As another example, the user engagement score increases the longer the extremity is directed to within the drawing application UI 204.

Figure 2C:
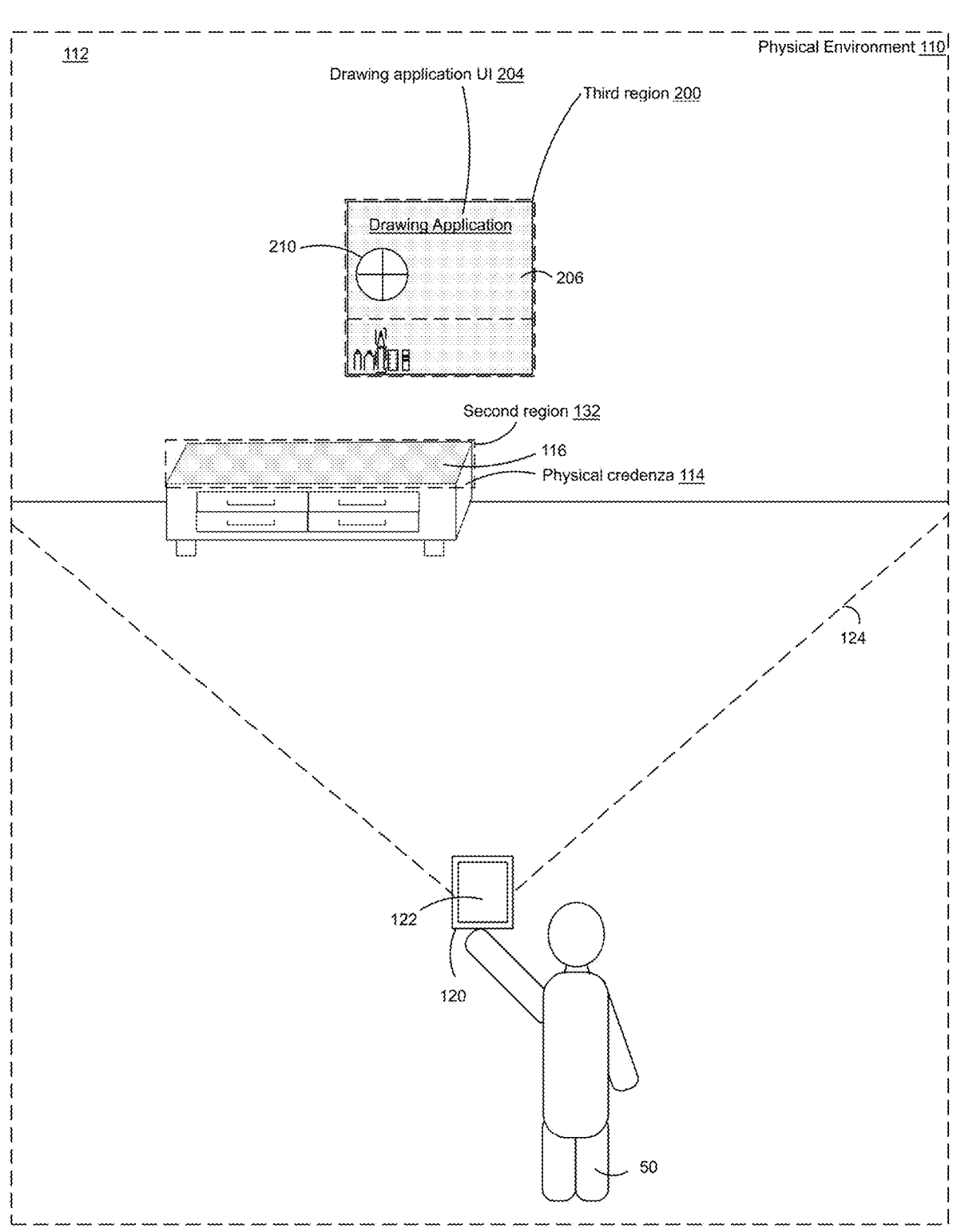

As one example, as illustrated in FIG. 2C, a reticle 210 indicates that the focus of the user (e.g., gaze or extremity) is directed to the drawing application UI 204. Accordingly, the electronic device 120 increases the high user engagement score. In some implementations, the electronic device 120 determines a display rendering mode change condition is satisfied by determining that the user engagement score satisfies (e.g., exceeds) an engagement threshold. Continuing with the previous example, the electronic device 120 determines that the display rendering mode change condition is satisfied because the relatively high user engagement score exceeds the engagement threshold.

Figure 2D:
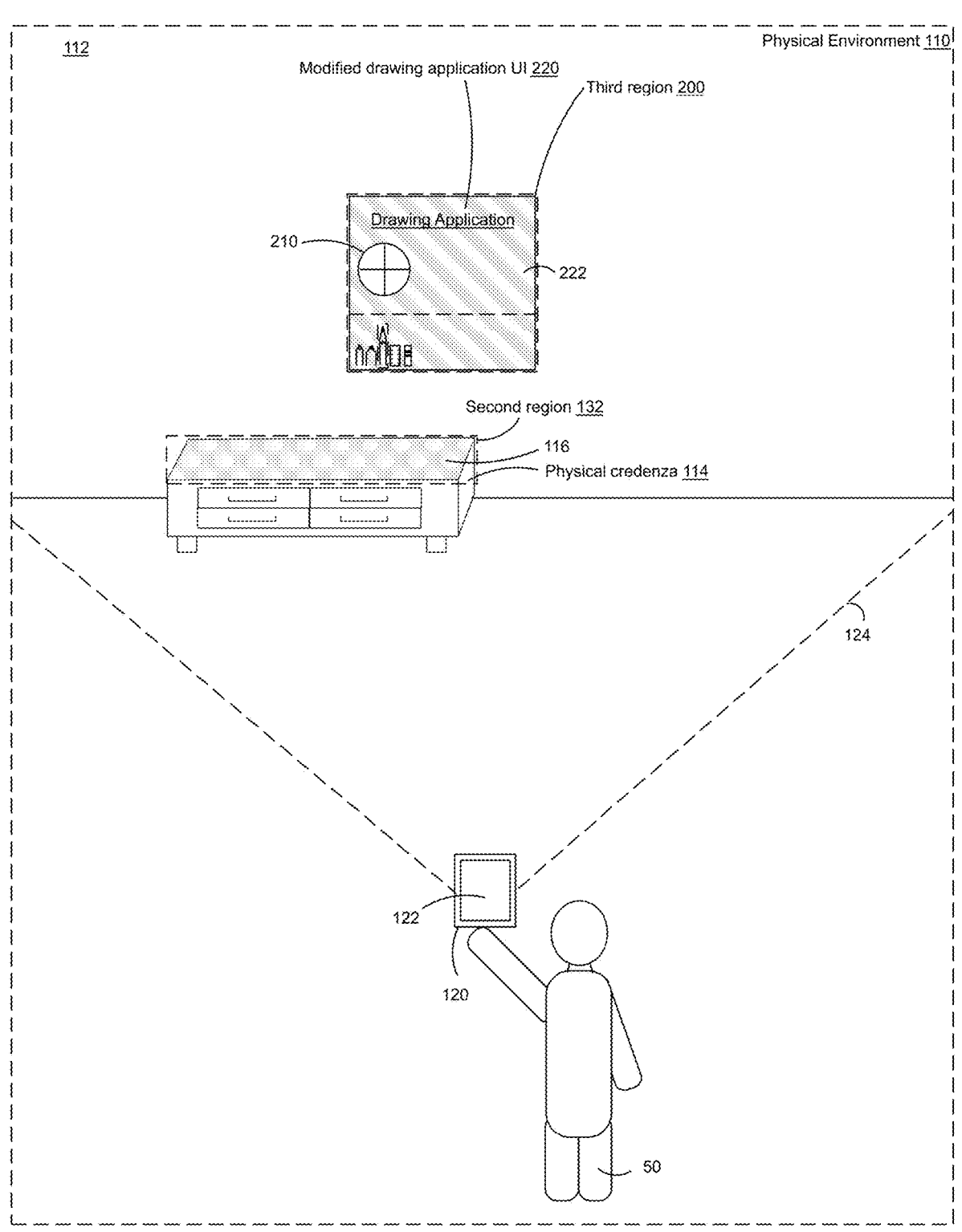

Accordingly, based on determining that the display rendering mode change condition is satisfied, the electronic device 120 changes from the first display rendering mode to a second display rendering mode. To that end, the electronic device 120 determines a sixth color characteristic 222 based on the fifth color characteristic 206 and the second color characteristic 116 (associated with the surface of the physical credenza 114). For example, the sixth color characteristic 222 corresponds to pink, because of a color mixing of the red 116 of the physical credenza 114 with the white of the drawing canvas. Moreover, based on determining that the display rendering mode change condition is satisfied, the electronic device 120 generates fourth computer-generated content based on the computer-generated content (the drawing application UI 204) and the sixth color characteristic 222. The fourth computer-generated content corresponds to a modified drawing application UI 220, which corresponds to a color adjusted version of the drawing application UI 204. Namely, the modified drawing application UI 220 is color adjusted from the fifth color characteristic 206 (white) to the sixth color characteristic 222 (pink). As illustrated in FIG. 2D, the electronic device 120 displays, within the third region 200, the modified drawing application UI 220 with the sixth color characteristic 222.

Figure 3A:
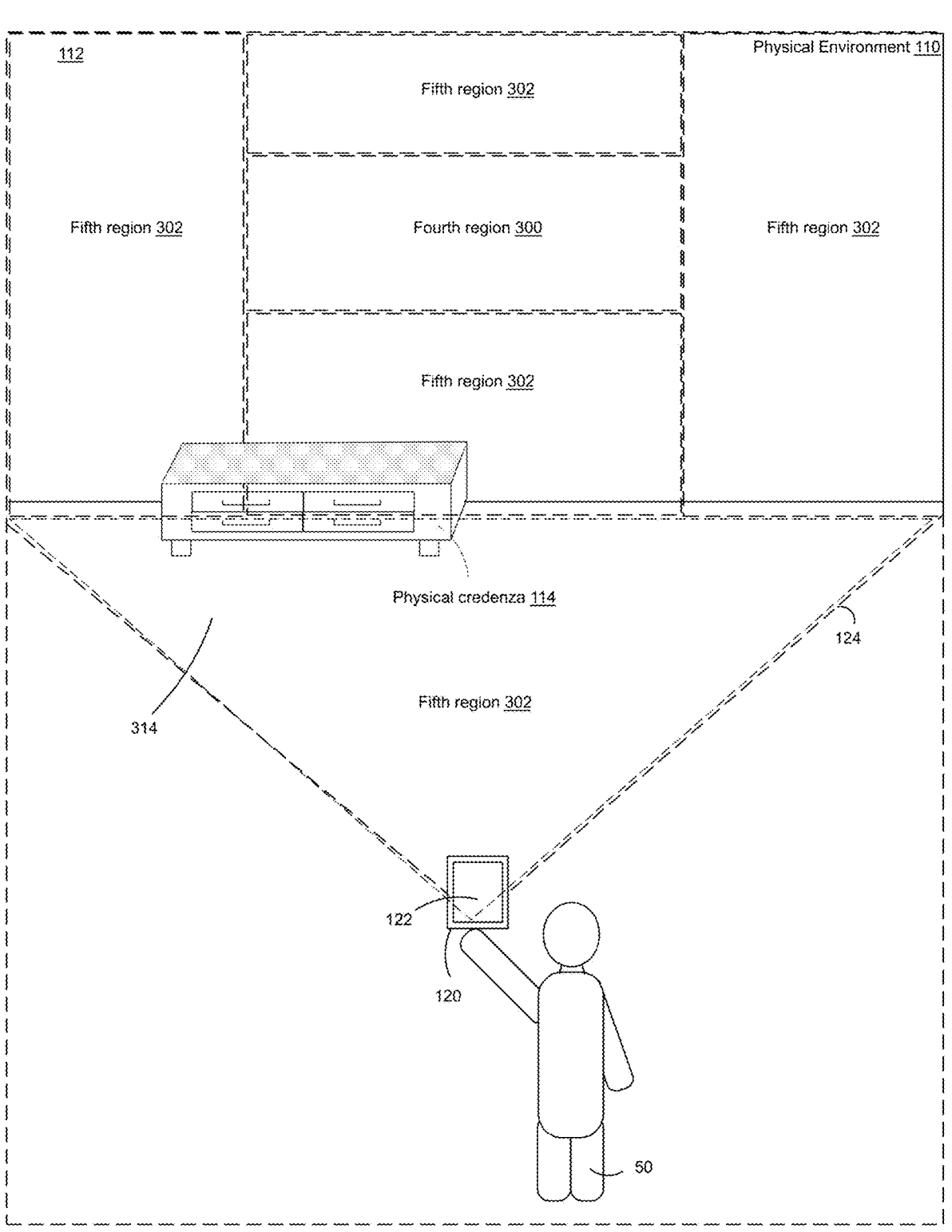
FIGS. 3A-3C are a third example of changing display rendering modes in accordance with some implementations.
Figure 3B:
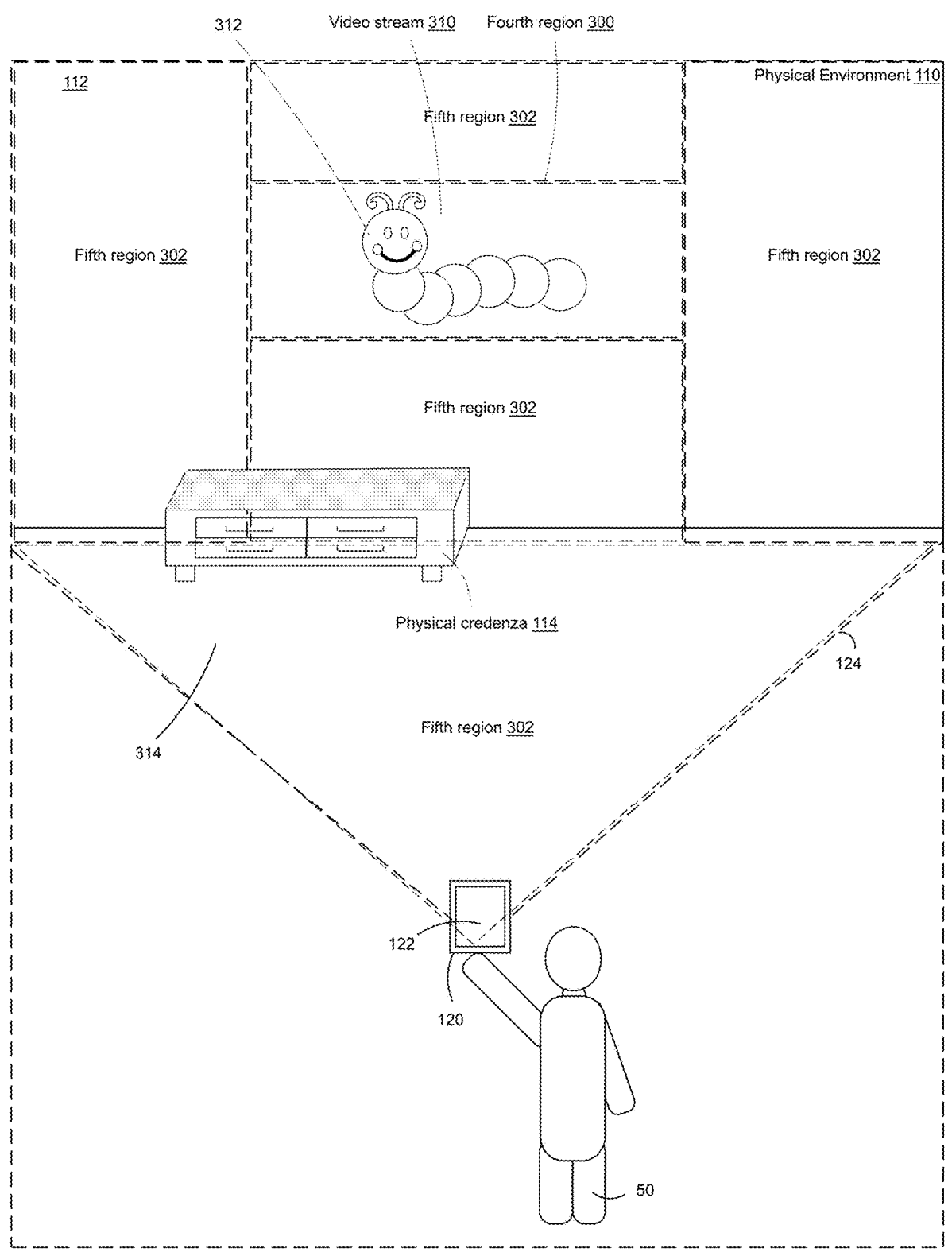
Figure 3C:
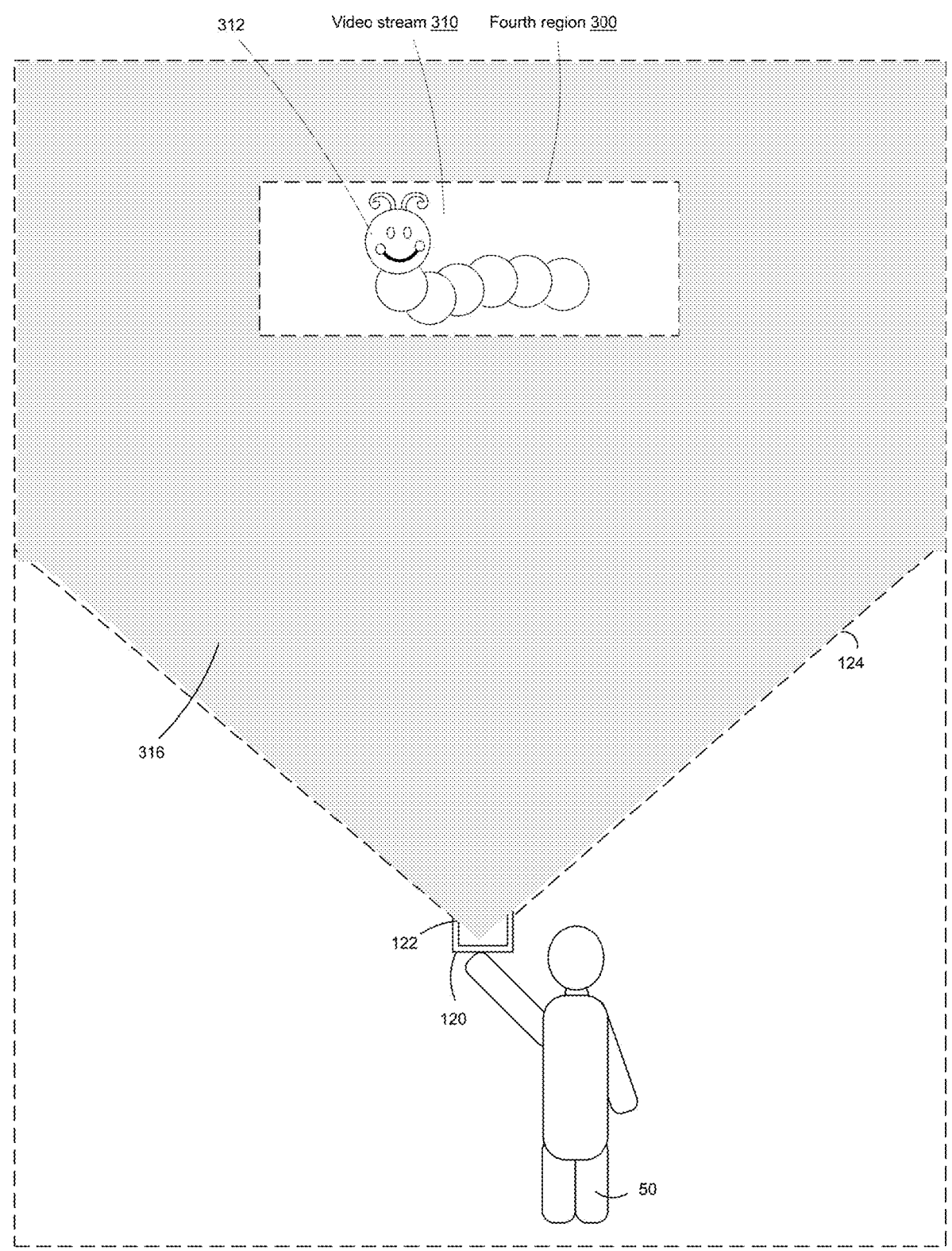

FIGS. 3A-3C are a third example of changing display rendering modes in accordance with some implementations. The example described with reference to FIGS. 3A-3C also operates within the physical environment 110, including the physical wall 112 and the red physical credenza 114.

The electronic device 120 obtains fifth computer-generated content that is associated with a fourth region 300 of the physical environment 110. The fourth region 300 is illustrated in FIG. 3A. As illustrated in FIG. 3A, the fourth region 300 is surrounded by a fifth region 302. In other words, the entirety of the viewable region 124 is comprised of the fourth region 300 and the surrounding fifth region 302. The fifth computer-generated content corresponds to a video stream 310 with a seventh color characteristic 312.

Moreover, the electronic device 120 detects an eighth color characteristic 314 that is associated with the fifth region 302. Because the fifth region 302 includes multiple physical surfaces and objects, the eighth color characteristic 314 may include a number of chromaticity values, luminance values, or white point values associated with the physical environment perceived in the fifth region 302.

As illustrated in FIG. 3B, while the electronic device 120 is in a first display rendering mode, the electronic device 120 displays, at a portion of the display 122 corresponding to the fourth region 300, the video stream 310 with the seventh color characteristic 312, and displays, at a portion of the display 122 corresponding to the fifth region 302, the eighth color characteristic 314.

According to various implementations disclosed herein, the electronic device 120 determines that a display rendering mode change condition is satisfied. In some implementations, in response to determining that the display rendering mode change condition is satisfied, the electronic device 120 changes from the first display rendering mode to a second display rendering mode. In some implementations and as illustrated in FIG. 3C, changing from the first display rendering mode to the second display rendering mode includes changing the fifth region 302 from the eighth color characteristic 314 to a ninth color characteristic 316, while maintaining the fourth region 300 with the seventh color characteristic 312. For example, changing the fifth region 302 to the ninth color characteristic 316 includes modifying (e.g., rendering) a portion of image data of the physical environment 110 (e.g., captured via a camera), wherein the portion corresponds to the fifth region 302. As another example, changing the fifth region 302 to the ninth color characteristic 316 includes displaying an overlay at a portion of the display 122 corresponding to the fifth region 302.

Changing the fifth region 302 from the eighth color characteristic 314 to the ninth color characteristic 316 helps to address a simultaneous contrast issue, in which the perception of the seventh color characteristic 312 is affected by the eighth color characteristic 314, and vice versa. Accordingly, changing the fifth region 302 to the ninth color characteristic 316 can help produce conditions ideal for perception of the video stream 310, while reducing user distractions from perceiving the video stream 310.

In some implementations, the ninth color characteristic 316 is based on a neutral tone criterion. For example, the ninth color characteristic 316 is monotoned or muted, such as grayscale. As one example, the ninth color characteristic 316 has a neutral color tone relative to the seventh color characteristic 312. To that end, in some implementations, determining the ninth color characteristic 316 includes applying a neutral tone map to image data of the physical environment 110. Applying the neutral tone map results in the ninth color characteristic 316 having sufficiently high contrast with respect to the seventh color characteristic 312, while having a sufficiently high opacity level to enable the user 50 to view the physical environment 110. Changing the fifth region 302 to a neutral color tone preserves the intent of the creator (of the video stream 310) to minimize distractions, thereby aiding the user 50 in focusing on the video stream 310. Moreover, the neutral color tone changes the physical environment 110 into a natural color space, while preserving the intended appearance of the video stream 310.

In some implementations, determining the ninth color characteristic 316 is further based on metadata associated with the fifth computer-generated content. For example, the metadata indicates a "video" application type associated with the fifth computer-generated content. Because the "video" application type is typically associated with a high level of user immersion, the electronic device 120 determines the ninth color characteristic 316 is a non-distracting color (e.g., neutral tone). As another example, the metadata indicates an immersion level associated with the computer-generated content. Containing with this example, the metadata indicates a relatively high immersion level associated with the fifth computer-generated content, because a suitable experience includes the user 50 being highly immersed in viewing the video stream 310.

Accordingly, as described in the previous examples, various implementations disclosed herein include changing display rendering modes (e.g., color modes). For example, some implementations include color adjusting computer-generated content based on a color characteristic associated with a physical environment, in order to integrate the computer-generated content with the physical environment. Examples of integrating the computer-generated content are described with reference to FIGS. 1A-1E and 2A-2D. These implementations may be characterized as an integrated color mode, as will be described further below. As another example, some implementations include color adjusting at least a portion of a physical environment in order to be neutrally colored with respect to displayed computer-generated content. An example of neutrally color adjusting the portion of the physical environment is described with reference to FIGS. 3A-3C. These implementations may be characterized as a computer-generated color preserved mode.

As further described herein, changing display rendering modes may be triggered by a user input (e.g., a user request to play a video stream), or independent of a user input. For example, when computer-generated content is world locked (e.g., anchored) to a first region of a physical environment, upon detecting the first region an electronic device color adjusts the computer-generated content. As another example, based on detecting an increase in luminance of ambient light from a physical environment (e.g., user turns on light), an electronic device adjusts a portion of the physical environment in order to be neutrally colored with respect to computer-generated content.

Figure 4:
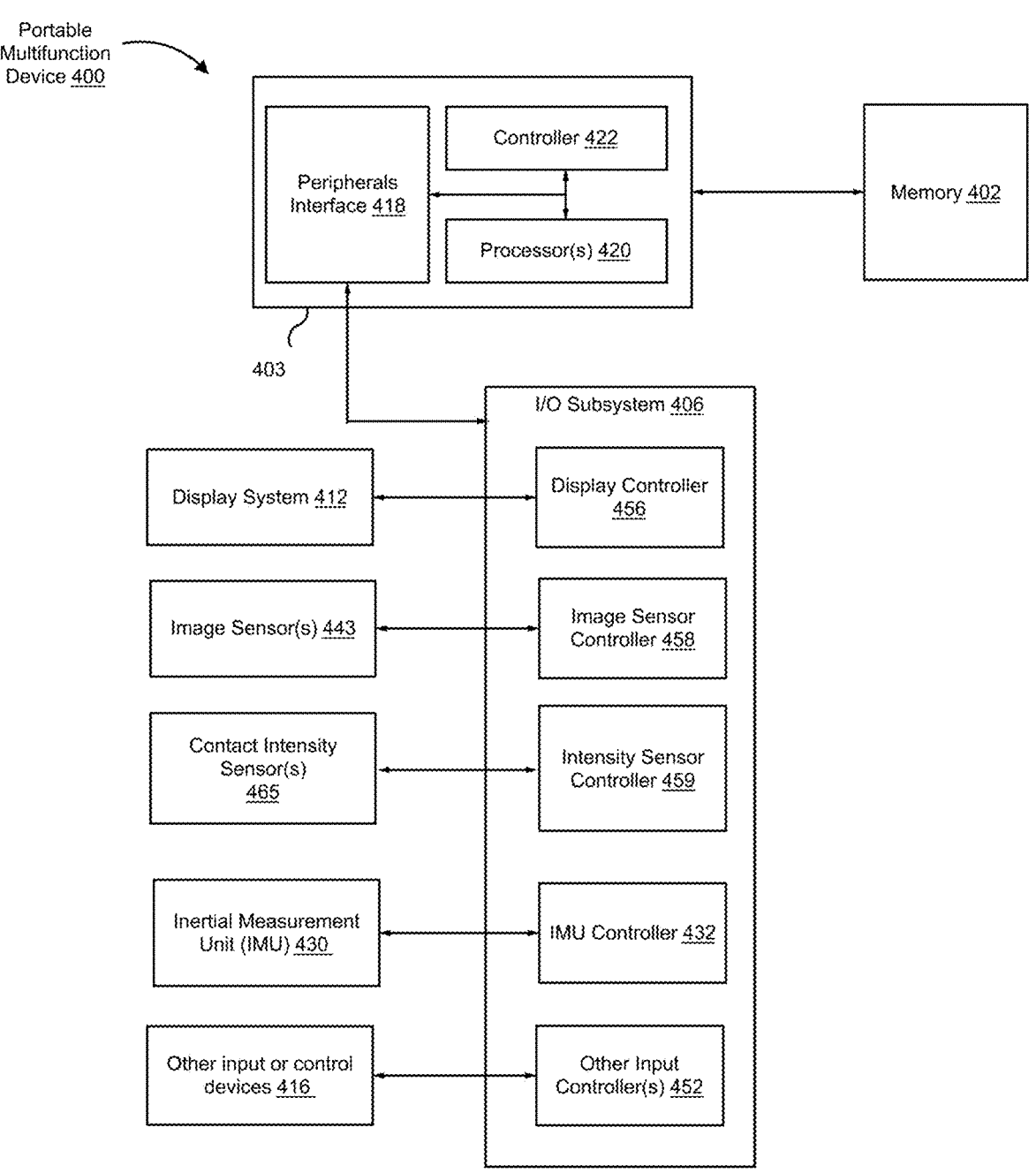
FIG. 4 is a block diagram of an example of a portable multifunction device in accordance with some implementations.

FIG. 4 is a block diagram of an example of a portable multifunction device 400 (sometimes also referred to herein as the "electronic device 400" for the sake of brevity) in accordance with some implementations. In some implementations, the electronic device 120 described with reference to FIGS. 1A-1E, FIGS. 2A-2D, or FIGS. 3A-3C includes some or all of the components of the electronic device 400.

The electronic device 400 includes a memory 402 (e.g., a non-transitory computer readable storage medium), a memory controller 422, one or more processing units (CPUs) 420, a peripherals interface 418, an input/output (I/O) subsystem 406, a display system 412, an inertial measurement unit (IMU) 430, image sensor(s) 443 (e.g., camera), contact intensity sensor(s) 465, and other input or control device(s) 416. In some implementations, the electronic device 400 corresponds to one of a mobile phone, tablet, laptop, wearable computing device, head-mountable device (HMD), head-mountable enclosure (e.g., the electronic device 400 slides into or otherwise attaches to a head-mountable enclosure), or the like. In some implementations, the head-mountable enclosure is shaped to form a receptacle for receiving the electronic device 400 with a display.

In some implementations, the peripherals interface 418, the one or more processing units 420, and the memory controller 422 are, optionally, implemented on a single chip, such as a chip 403. In some other implementations, they are, optionally, implemented on separate chips.

The I/O subsystem 406 couples input/output peripherals on the electronic device 400, such as the display system 412 and the other input or control devices 416, with the peripherals interface 418. The I/O subsystem 406 optionally includes a display controller 456, an image sensor controller 458, an intensity sensor controller 459, one or more input controllers 452 for other input or control devices, and an IMU controller 432, The one or more input controllers 452 receive/send electrical signals from/to the other input or control devices 416. One example of the other input or control devices 416 is an eye tracker that tracks an eye gaze of a user. Another example of the other input or control devices 416 is an extremity tracker that tracks an extremity (e.g., a finger) of a user. In some implementations, the one or more input controllers 452 are, optionally, coupled with any (or none) of the following: a keyboard, infrared port, Universal Serial Bus (USB) port, stylus, finger-wearable device, and/or a pointer device such as a mouse. The one or more buttons optionally include a push button. In some implementations, the other input or control devices 416 includes a positional system (e.g., GPS) that obtains information concerning the location and/or orientation of the electronic device 400 relative to a particular object. In some implementations, the other input or control devices 416 include a depth sensor and/or a time-of-flight sensor that obtains depth information characterizing a physical object within a physical environment. In some implementations, the other input or control devices 416 include an ambient light sensor that senses ambient light from a physical environment and outputs corresponding ambient light data.

The display system 412 provides an input interface and an output interface between the electronic device 400 and a user. The display controller 456 receives and/or sends electrical signals from/to the display system 412. The display system 412 displays visual output to the user. The visual output optionally includes graphics, text, icons, video, and any combination thereof (sometimes referred to herein as "computer-generated content"). In some implementations, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

The display system 412 may have a touch-sensitive surface, sensor, or set of sensors that accepts input from the user based on haptic and/or tactile contact. The display system 412 and the display controller 456 (along with any associated modules and/or sets of instructions in the memory 402) detect contact (and any movement or breaking of the contact) on the display system 412 and converts the detected contact into interaction with user-interface objects (e.g., one or more soft keys, icons, web pages or images) that are displayed on the display system 412.

The display system 412 optionally uses LCD (liquid crystal display) technology, LPD (light emitting polymer display) technology, or LED (light emitting diode) technology, although other display technologies are used in other implementations. The display system 412 and the display controller 456 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with the display system 412. The display system 412 may utilize digital light projection, OLEDs, LEDs, uLEDs, liquid crystal on silicon, laser scanning light source, or any combination of these technologies.

The user optionally makes contact with the display system 412 using any suitable object or appendage, such as a stylus, a finger-wearable device, a finger, and so forth. In some implementations, the user interface is designed to work with finger-based contacts and gestures, which can be less precise than stylus-based input due to the larger area of contact of a finger on the touch screen. In some implementations, the electronic device 400 translates the rough finger-based input into a precise pointer/cursor position or command for performing the actions desired by the user.

The inertial measurement unit (IMU) 430 includes accelerometers, gyroscopes, and/or magnetometers in order to measure various forces, angular rates, and/or magnetic field information with respect to the electronic device 400. Accordingly, according to various implementations, the IMU 430 detects one or more positional change inputs of the electronic device 400, such as the electronic device 400 being shaken, rotated, moved in a particular direction, and/or the like.

The image sensor(s) 443 capture still images and/or video. In some implementations, an image sensor 443 is located on the back of the electronic device 400, opposite a touch screen on the front of the electronic device 400, so that the touch screen is enabled for use as a viewfinder for still and/or video image acquisition. In some implementations, another image sensor 443 is located on the front of the electronic device 400 so that the user's image is obtained (e.g., for selfies, for videoconferencing while the user views the other video conference participants on the touch screen, etc.). In some implementations, the image sensor(s) are integrated within an HMD. For example, the image sensor(s) 443 output image data that represents a physical object (e.g., a physical agent) within a physical environment.

The contact intensity sensors 465 detect intensity of contacts on the electronic device 400 (e.g., a touch input on a touch-sensitive surface of the electronic device 400). The contact intensity sensors 465 are coupled with the intensity sensor controller 459 in the I/O subsystem 406. The contact intensity sensor(s) 465 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). The contact intensity sensor(s) 465 receive contact intensity information (e.g., pressure information or a proxy for pressure information) from the physical environment. In some implementations, at least one contact intensity sensor 465 is collocated with, or proximate to, a touch-sensitive surface of the electronic device 400. In some implementations, at least one contact intensity sensor 465 is located on the side of the electronic device 400.

Figure 5:
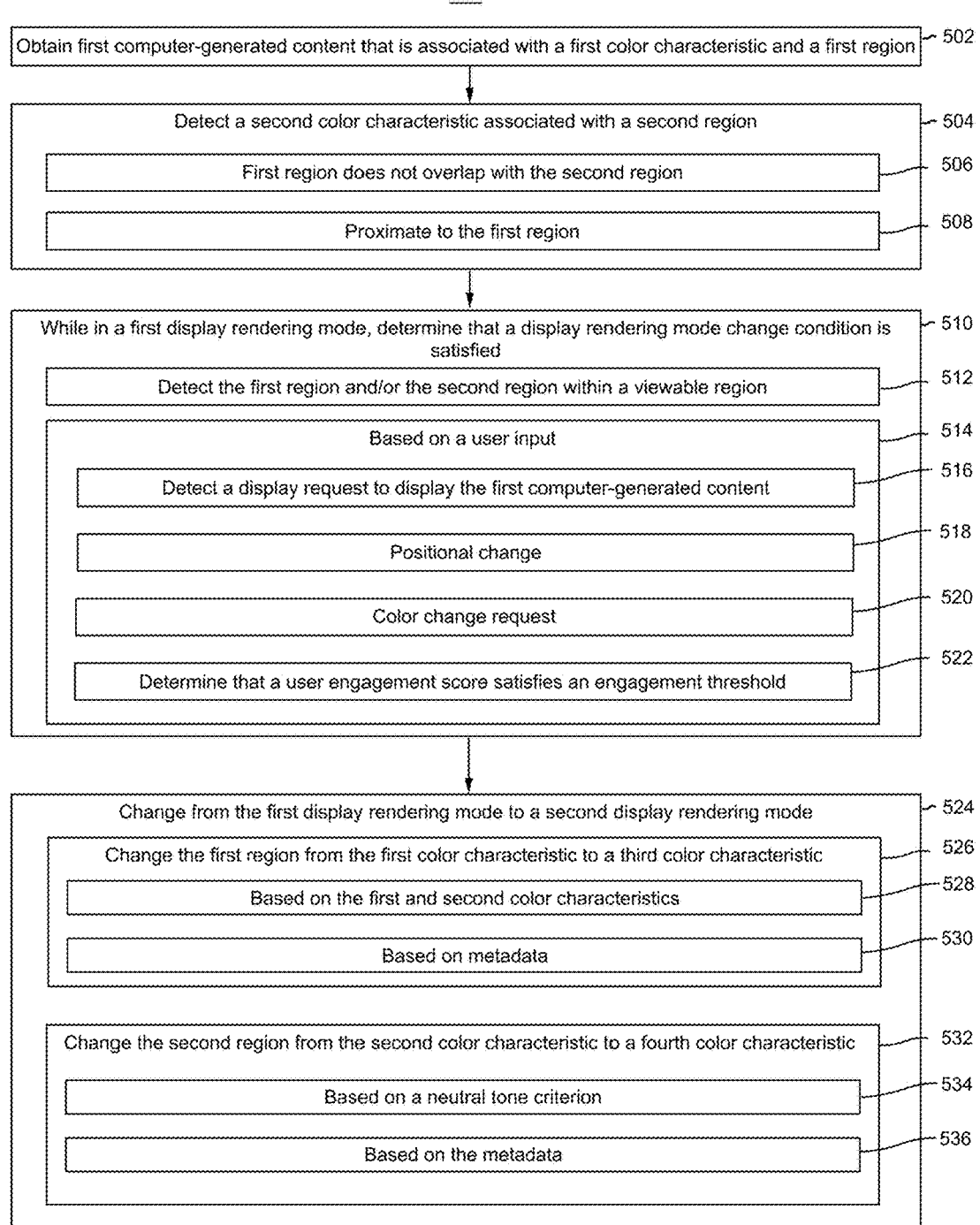
FIG. 5 is an example of a flow diagram of a method of changing display rendering modes in accordance with some implementations.

FIG. 5 is an example of a flow diagram of a method 500 of changing display rendering modes in accordance with some implementations. In various implementations, the method 500 or portions thereof are performed by an electronic device (e.g., the electronic device 120 illustrated in FIGS. 1A-1E, 2A-2D, and/or 3A-3C). In various implementations, the method 500 or portions thereof are performed by a mobile device, such as a smartphone, tablet, or wearable device. In various implementations, the method 500 or portions thereof are performed by a head-mountable device (HMD) including a display. In some implementations, the method 500 is performed by processing logic, including hardware, firmware, software, or a combination thereof. In some implementations, the method 500 is performed by a processor executing code stored in a non-transitory computer-readable medium (e.g., a memory).

As represented by block 502, the method 500 includes obtaining computer-generated content that is associated with a first color characteristic. For example, the first color characteristic indicates chromaticity, chroma, luminance, white point, and/or the like. The computer-generated content is associated with a first region of a physical environment. For example, the computer-generated content is to be displayed at a portion of a display corresponding to the first region. The computer-generated content may be world-locked to the first region, such that a positional change of the electronic device results in a corresponding display position change of the computer-generated content. The computer-generated content may correspond to any type of content, such as a user interface (UI), textual content, a web page, static image, video stream, two-dimensional (2D) object, three-dimensional (3D) object, etc. As one example, with reference to FIGS. 1A and 1D, the computer-generated content 100 is associated with and thus displayed within the first region 106. As another example, with reference to FIG. 2B, the computer-generated content corresponds to the drawing application UI 204 displayed within the third region 200 of the physical environment 110. In some implementations, the method 500 includes obtaining the computer-generated content from a non-transitory memory (e.g., cache or random access memory (RAM)) of an electronic device performing the method 500. In some implementations, the method 500 includes obtaining, via a communication interface (e.g., Wi-Fi or Bluetooth), the computer-generated content from an external device/system. In some implementations, an electronic device performing the method 500 renders (e.g., via a graphics processing unit (GPU)) an object in order to generate the computer-generated content.

As represented by block 504, the method 500 includes detecting a second color characteristic associated with a second region of the physical environment. For example, the second color characteristic indicates chromaticity, chroma, luminance, white point, and/or the like. The first region is different from the second region. For example, in some implementations, detecting the second color characteristic includes identifying pixel values associated with pixels of an image of a physical environment, wherein the pixels corresponds to the second region. In the previous example, the pixel values indicate the second color characteristic.

In some implementations, the method 500 includes setting the second region to a position of a physical object within the physical environment. To that end, in some implementations, an electronic device performing the method 500 includes an image sensor that captures a first image of the physical environment, and the method 500 includes determining the second region by identifying, via computer vision, the physical object represented within the first image. For example, with reference to FIG. 1B, the electronic device 120 captures an image of the physical environment 110, and identifies the physical credenza 114 (and/or the surface of the physical credenza 114) within the image. In some implementations, identifying the physical object includes determining that the physical object satisfies a proximity threshold with respect to the first region. In some implementations, detecting the second color characteristic includes identifying, within an image, a subset of pixels that corresponds to the physical object, and identifying pixel values respectively associated with the subset of pixels, wherein the pixel values indicate the second color characteristic.

As represented by block 506, in some implementations, the first region is positioned in a non-overlapping arrangement with respect to the second region. For example, with reference to FIG. 3A, the fourth region 300 does not overlap with the fifth region 302.

As represented by block 508, in some implementations, the first region is proximate to the second region. For example, with reference to FIG. 2A, the third region 200 (associated with the drawing application UI 204) is proximate to the second region 132 (associated with the surface of the physical credenza 114). In some implementations, a user's field of view is formed of the first region and the second region, where the second region is the remaining area of the user's field of view outside of the first region. In some implementations, the second region surrounds (e.g., borders) the first region.

As represented by block 510, while an electronic device is in a first display rendering mode including the first and second color characteristics, the method 500 includes determining that a display rendering mode change condition is satisfied. In some implementations, while the electronic device is in the first display rendering mode, the method 500 includes rendering the computer-generated content with the first color characteristic. In some implementations, while the electronic device is in the first display rendering mode, the method 500 includes rendering image data of a physical environment with the second color characteristic, wherein the image data represents the second region. Moreover, in some implementations, while in the first display rendering mode, the method 500 includes displaying the computer-generated content with the first color characteristic at a portion of the display corresponding to the first region, and/or displaying the second color characteristic at a portion of the display corresponding to the second region.

As represented by block 512, in some implementations, determining that the display rendering mode change condition is satisfied includes detecting the first region and/or the second region within a viewable region associated with a display of the electronic device. For example, with reference to FIG. 1C, based on detecting the first region 106 and the second region 132, the electronic device 120 determines that the display rendering mode change condition is satisfied. In some implementations, detecting the first region and/or the second region includes performing computer vision with respect to image data of the physical environment, such as instance segmentation or semantic segmentation.

In some implementations, determining that the display rendering mode change condition is satisfied is based on metadata associated with the computer-generated content. For example, the metadata indicates an immersion level, which indicates an appropriate level of user immersion associated with the computer-generated content. As one example, with reference to FIG. 3B, the electronic device 120 obtains metadata associated with the video stream 310, wherein the metadata indicates a relatively high immersion level. Continuing with this example, the electronic device 120 determines that the display rendering mode change condition is satisfied because the relatively high immersion level is above a threshold level, and thus initiates a display rendering mode change, as illustrated in FIG. 3C. Metadata can also indicate a content type of the computer-generated content. Thus, in some implementations, the electronic device 120 may determine that the display rendering mode change condition is satisfied because the computer-generated content is a movie, piece of artwork, picture, and/or the like. For example, for computer-generated content of a "cinematic" content type, the electronic device 120 changes to a dark display rendering mode, in which portion of a physical environment surrounding the computer-generated content is darkened in order to improve user immersion with respect to the computer-generated content.

In some implementations, the computer-generated content is generated by an application, and the application sends a request (e.g., via an application programming interface (API)) to change display rendering mode. Reception of the request may result in satisfaction of the display rendering mode change condition. In some implementations, the application sends an indication of content type of the computer-generated content (e.g., movie content), and determining that the display rendering mode change condition is satisfied includes determining that the content type is a predetermined content type.

As represented by block 514, in various implementations, determining that the display rendering mode change condition is satisfied is based on a user input.

For example, as represented by block 516, determining that the display rendering mode change condition is satisfied includes detecting a display request to display the computer-generated content. As one example, with reference to FIGS. 3A and 3B, the electronic device 120 detects a user input requesting to play the video stream 310, such as the user 50 selecting a thumbnail of the video stream 310. As another example, detecting a display request includes receiving a requests to launch an application associated with the computer-generated content. For example, with reference to FIGS. 2A and 2B, the electronic device 120 receives a request from the user 50 to open a drawing application, which is associated with the drawing application UI 204. In some implementations, detecting the display request includes receiving a user input that selects an initiate display affordance. Examples of the user input include an extremity (e.g., finger) of a user that is directed to the initiate display affordance, or an eye gaze of the user that is directed to the initiate display affordance. In some implementations, detecting the display request is independent of receiving a user input, such as when an electronic device performing the method 500 receives, via an integrated communication interface (e.g., Wi-Fi interface of Bluetooth interface), the display request from another device or from a system.

As another example, as represented by block 518, determining that the display rendering mode change condition is satisfied is based on a positional change of an electronic device performing the method 500. For example, the electronic device includes an input device corresponding to a positional sensor (e.g., an inertial measurement unit (IMU), which detects a positional change of the electronic device. As one example, the positional change corresponds to a user input rotating the electronic device. Accordingly, based on detecting the positional change, the electronic device detects the first region and/or the second region within a viewable region associated with a display of the electronic device, such as is described with reference to block 512. Accordingly, the electronic device determines that the display rendering mode change condition is satisfied.

As yet another example, as represented by block 520, the user input corresponds to a color change request. To that end, the method 500 includes detecting a user input requesting a color change. Determining that the display rendering mode change condition is satisfied includes detecting the user input requesting the color change. An example of the color change request is a gaze input or an extremity input directed to a color change affordance, such as an increase color contrast affordance, increase user immersion affordance, etc.

As yet another example, as represented by block 522, determining that the display rendering mode change condition is satisfied includes determining that an engagement score satisfies an engagement threshold. The engagement score characterizes a level of user engagement with respect to the computer-generated content. To that end, the method 500 includes, while displaying the computer-generated content with the first color characteristic at a location on the display corresponding to the first region, determining the user engagement score. For example, with reference to FIG. 2C, the electronic device 120 determines a relatively high engagement score based on the user 50 focusing on the drawing application UI 204, as indicated by the reticle 210. The engagement score may be based on eye gaze of a user relative to the computer-generated content, a position of an extremity of a user relative to the computer-generated content, and/or duration of the gaze/extremity directed to the computer-generated content.

As yet another example, in some implementations, determining that the display rendering mode change condition is satisfied is based on a ratio of the size of the first region to the size of the viewable region of the display. For example, the display rendering mode change condition is satisfied when the ratio is above a threshold. As one example, with reference to FIG. 3A, the size of the viewable region 124 corresponds to the combined sizes of the fourth region 300 and the fifth region 302. Continuing with this example, the electronic device 120 may determine that the size of the fourth region 300 is a relatively large percentage of the size of the viewable region 124, and accordingly determines that the display rendering mode change condition is satisfied.

As represented by block 524, in response to determining that the display rendering mode change condition is satisfied, the method 500 includes changing the electronic device from the first display rendering mode to a second display rendering mode. In some implementations, the second display rendering mode corresponds to an integrated color mode, such as described with reference to FIGS. 1A-1E and 2A-2D. In some implementations, the second display rendering mode corresponds to a computer-generated content color preservation mode, such as described with reference to FIGS. 3A-3C. In some implementations, while the electronic device is in the second display rendering mode, the method 500 includes rendering the computer-generated content with a third color characteristic (as described with reference to block 526). In some implementations, while the electronic device is in the second display rendering mode, the method 500 includes rendering image data of a physical environment with a fourth color characteristic (as described with reference to block 532), wherein the image data represents the second region. Moreover, in some implementations, while in the second display rendering mode, the method 500 includes displaying the computer-generated content with the third color characteristic at a portion of the display corresponding to the first region, and/or displaying the fourth color characteristic at a portion of the display corresponding to the second region.

In some implementations, changing the electronic device from the first display rendering mode to the second display rendering mode includes changing a display characteristic (e.g., a hardware characteristic) associated with the display. For example, while an electronic device displays a video on a first set of display pixels, the method 500 includes dimming (e.g., set to a neutral tone) a second set of display pixels that surround the video, in order to reduce user distraction from viewing the video on the display.

As represented by block 526, in some implementations, changing the electronic device from the first display rendering mode to the second display rendering mode includes changing, on a display of the electronic device, the first region from the first color characteristic to a third color characteristic. For example, while in the second display rendering mode, the method 500 includes displaying the computer-generated content with the third color characteristic at the portion of the display corresponding to the first region. As represented by block 528, in some implementations, the third color characteristic is based on the first and second color characteristics. For example, with reference to FIGS. 1D and 1E, the electronic device 120 changes the bottom portion of the computer-generated content 100 from the first color characteristic 104 (white) to the third color characteristic 142 (pink), based on color mixing the first color characteristic 104 (white) with the second color characteristic 116 (red). In some implementations, the third color characteristic is harmonious with respect to the first and second color characteristics. For example, the third color characteristic is determined by applying a color appearance model to the first and second color characteristics. Examples of color harmony include adequate chromaticity contrast, adequate luminance contrast, or a combination thereof.

As represented by block 530, in some implementations, the third color characteristic is further based on metadata associated with the computer-generated content. For example, the metadata indicates an application type associated with the computer-generated content, or the metadata indicates an immersion level associated with the computer-generated content. For example, with reference to FIGS. 2A-2D, the electronic device 120 obtains metadata indicating a drawing application type associated with the drawing application UI 204. A drawing application type typically provides a drawing canvas and a tool region including a set of drawing affordances (e.g., pencil, pen, etc.). The drawing canvas is typically white so as to enable a user to appreciate drawing operations made on the drawing canvas. Continuing with this example, the electronic device 120 may select the sixth color characteristic 222 to blend more into the tool region than the drawing canvas, in order to preserve the whiteness of the drawing canvas. Namely, the modified drawing application UI 220 may include a pink tool region, and a substantially white drawing canvas. As another example, the method 500 includes color adjusting the computer-generated content to a higher degree when the immersion level is higher. For example, the third color characteristic is based on the first and second color characteristics (e.g., weighted color mixing), wherein the weight of the second color characteristic is proportional to the immersion level.

As represented by block 532, in some implementations, changing the electronic device from the first display rendering mode to the second display rendering mode includes changing, on the display, the second region from the second color characteristic to a fourth color characteristic different from the third color characteristic. For example, while the electronic device is in the second display rendering mode, the method 500 includes displaying the fourth color characteristic at the portion of the display corresponding to the second region. As one example, with reference to FIGS. 3A-3C, the electronic device 120 changes the fifth region 302 from the eighth color characteristic 314 to the ninth color characteristic 316, while maintaining the fourth region 300 with the seventh color characteristic 312.

As represented by block 534, in some implementations, the fourth color characteristic is based on a neutral tone criterion. To that end, in some implementations, the method 500 includes assigning the fourth color characteristic to a neutral tone (e.g., grayscale or monotoned), in order to reduce user distraction from the computer-generated content. In some implementations, determining the fourth color characteristic includes applying a neutral tone map to image data of the physical environment. Accordingly, in some implementations, the fourth color characteristic is independent of the first color characteristic and the second color characteristic. As represented by block 536, in some implementations, the fourth color characteristic is further based on the metadata. For example, with reference to FIGS. 3A-3C, when the metadata indicates a "video stream," the fourth color characteristic is chosen to be grayscale, in order to reduce the likelihood that the user 50 is distracted from viewing the video stream 310.

In some implementations, changing the second region includes modifying image data of the physical environment. To that end, in some implementations, an electronic device performing the method 500 includes an image sensor (e.g., a camera) that captures the image data. Moreover, the method 500 includes modifying a portion of the image data that corresponds to the second region in order to generate modified image data, and displaying the modified image data on the display.

In some implementations, changing the second region includes modifying a capture characteristic associated with the capture of image data, rather than modifying a portion of the image data. For example, while in the first display rendering mode, the image sensor captures first image data of the physical environment according to a first exposure level. The first image data has the second color characteristic. Continuing with this example, changing the second region includes changing the capture characteristic (e.g., dimming the image sensor) to capture second image data of the physical environment according to a second exposure level that is lower than the first exposure level. The second image data has the fourth color characteristic. Changing the capture characteristic of the image may more efficient than modifying the image data later in the graphics pipeline.

In some implementations, changing the second region includes displaying an overlay with the fourth color characteristic. For example, changing the second region from the second color characteristic to the fourth color characteristic includes displaying the overlay at a portion of the display corresponding to the second region.

In some implementations, the method 500 includes determining whether to change the first region or the second region. To that end, the method 500 includes determining to change the first region based on a determination that the computer-generated content satisfies an integrated color criterion, and determining to change the second region based on a determination that the computer-generated content satisfies a computer-generated content color preservation criterion. For example, determining whether the computer-generated content satisfies the integrated color criterion or the computer-generated content color preservation criterion is based on metadata associated with the computer-generated content. As one example, metadata indicating the computer-generated content is suitable for presentation in a "mixed reality (MR) environment" satisfies the integrated color criterion. As another example, metadata indicating the computer-generated content is associated with a high level of user engagement (e.g., a video stream) satisfies the computer-generated content color preservation criterion.

In some implementations, changing the electronic device from the first display rendering mode to the second display rendering mode includes changing the first region from the first color characteristic to the third color characteristic, and changing the second region from the second color characteristic to the fourth color characteristic. In some implementations, changing the first region is substantially concurrent with changing the second region.

In some implementations, changing the electronic device from the first display rendering mode to the second display rendering mode includes changing the first region from the first color characteristic to the third color characteristic, and maintaining the second region with the second color characteristic. In some implementations, changing the electronic device from the first display rendering mode to the second display rendering mode includes changing the second region from the second color characteristic to the fourth color characteristic, and maintaining the first region with the first color characteristic.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be implemented in such program instructions, although some or all of the disclosed functions may alternatively be implemented in application-specific circuitry (e.g., ASICs or FPGAs or GP-GPUs) of the computer system. Where the computer system includes multiple computing devices, these devices may be co-located or not co-located. The results of the disclosed methods and tasks may be persistently stored by transforming physical storage devices, such as solid-state memory chips and/or magnetic disks, into a different state.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various implementations described above can be combined to provide further implementations. Accordingly, the novel methods and systems described herein may be implemented in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed:

1. A method comprising:
at an electronic device with one or more processors, a non-transitory memory, and a display:
displaying, on the display, an extended reality (XR) environment;
obtaining computer-generated content associated with a first color characteristic, wherein the computer-generated content in the XR environment is displayed at a first portion of the display corresponding to the first region of a physical environment;
detecting a second color characteristic in the XR environment displayed at a second portion of the display corresponding to the second region of the physical environment different from the first region of the physical environment;
while the electronic device is in a first display rendering mode including the first and second color characteristics, determining that a display rendering mode change condition is satisfied; and in response to determining that the display rendering mode change condition is satisfied, changing the electronic device from the first display rendering mode to a second display rendering mode, wherein changing to the second display rendering mode includes:

changing, on the display, the first portion corresponding to the first region from the first color characteristic to a third color characteristic, including modifying the computer-generated content displayed in the XR environment based on the changing first portion; or changing, on the display, the second portion corresponding to the second region from the second color characteristic to a fourth color characteristic different from the third color characteristic.

2. The method of claim 1, wherein while the electronic device is in the first display rendering mode, the method includes displaying:

the computer-generated content with the first color characteristic at the first portion of the display corresponding to the first region; and the second color characteristic at the second portion of the display corresponding to the second region.

3. The method of claim 2, wherein while the electronic device is in the second display rendering mode, the method includes displaying:

the computer-generated content with the third color characteristic at the first portion of the display corresponding to the first region; or the fourth color characteristic at the second portion of the display corresponding to the second region.

4. The method of claim 1, wherein changing to the second display rendering mode includes:

changing the first portion corresponding to the first region from the first color characteristic to the third color characteristic; and changing the second portion corresponding to the second region from the second color characteristic to the fourth color characteristic.

5. The method of claim 1, wherein changing to the second display rendering mode includes determining whether to change the first region or the second region.

6. The method of claim 5, wherein determining whether to change the first region or the second region includes:

determining to change the first region based on a determination that the computer-generated content satisfies an integrated color criterion; and determining to change the second region based on a determination that the computer-generated content satisfies a computer-generated content color preservation criterion.

7. The method of claim 1, wherein the third color characteristic is based on the first and second color characteristics.

8. The method of claim 7, wherein the third color characteristic is harmonious with respect to the first and second color characteristics.

9. The method of claim 1, wherein modifying the computer-generated content includes performing a tone mapping operation on the computer-generated content based on the third color characteristic.

10. The method of claim 1, wherein the fourth color characteristic is based on a neutral tone criterion.

11. The method of claim 1, wherein the fourth color characteristic is independent of the first color characteristic and the second color characteristic.

12. The method of claim 1, wherein at least one of the third color characteristic or the fourth color characteristic is based on metadata associated with the computer-generated content.

13. The method of claim 12, wherein the metadata indicates an application type associated with the computer-generated content.

14. The method of claim 12, wherein the metadata indicates an immersion level associated with the computer-generated content.

15. The method of claim 1, wherein the electronic device includes an image sensor that captures image data of the physical environment, and wherein changing the second portion corresponding to the second region from the second color characteristic to the fourth color characteristic includes:

modifying a portion of the image data that corresponds to the second region, in order to generate modified image data; and displaying the modified image data on the display.

16. The method of claim 1, wherein the electronic device includes an image sensor, wherein in the first display rendering mode the image sensor captures first image data of the physical environment according to a first capture characteristic, wherein the first image data has the second color characteristic, and wherein changing the second region from the second color characteristic to the fourth color characteristic includes:

changing the image sensor from the first capture characteristic to a second capture characteristic; and capturing second image data of the physical environment according to the second capture characteristic while in the second display rendering mode, wherein the second image data has the fourth color characteristic.

17. The method of claim 1, wherein changing the second region from the second color characteristic to the fourth color characteristic includes displaying an overlay at a portion of the display corresponding to the second region, wherein the overlay has the fourth color characteristic.

18. The method of claim 1, wherein the display is associated with a viewable region of the physical environment, and wherein the second region includes an entirety of the viewable region, excluding the first region.

19. A non-transitory computer readable storage medium storing one or more programs, the one or more programs comprising instructions, which, when executed by an electronic device including a display, cause the electronic device to:

display, on the display, an extended reality (XR) environment;

obtain computer-generated content associated with a first color characteristic, wherein the computer-generated content in the XR environment is displayed at a first portion of the display corresponding to the first region of a physical environment;

detect a second color characteristic in the XR environment displayed at a second portion of the display corresponding to the second region of the physical environment different from the first region of the physical environment;

while the electronic device is in a first display rendering mode including the first and second color characteristics, determine that a display rendering mode change condition is satisfied; and in response to determining that the display rendering mode change condition is satisfied, change the electronic device from the first display rendering mode to a second display rendering mode, wherein changing to the second display rendering mode includes:

changing, on the display, the first portion corresponding to the first region from the first color characteristic to a third color characteristic, including modifying the computer-generated content displayed in the XR environment based on the changing first portion; or changing, on the display, the second portion corresponding to the second region from the second color characteristic to a fourth color characteristic different from the third color characteristic.

20. An electronic device comprising:

a display;

a non-transitory memory; and one or more processors to:

display, on the display, an extended reality (XR) environment;

obtain computer-generated content associated with a first color characteristic, wherein the computer-generated content in the XR environment is displayed at a first portion of the display corresponding to the first region of a physical environment;

detect a second color characteristic in the XR environment displayed at a second portion of the display corresponding to the second region of the physical environment different from the first region of the physical environment;

while the electronic device is in a first display rendering mode including the first and second color characteristics, determine that a display rendering mode change condition is satisfied; and in response to determining that the display rendering mode change condition is satisfied, change the electronic device from the first display rendering mode to a second display rendering mode, wherein changing to the second display rendering mode includes:

changing, on the display, the first portion corresponding to the first region from the first color characteristic to a third color characteristic, including modifying the computer-generated content displayed in the XR environment based on the changing first portion; or changing, on the display, the second portion corresponding to the second region from the second color characteristic to a fourth color characteristic different from the third color characteristic.

21. The non-transitory computer readable storage medium of claim 19, wherein the electronic device includes an image sensor that captures image data of the physical environment, and wherein changing the second portion corresponding to the second region from the second color characteristic to the fourth color characteristic includes:

modifying a portion of the image data that corresponds to the second region, in order to generate modified image data; and displaying the modified image data on the display.

22. The non-transitory computer readable storage medium of claim 21, wherein modifying the portion of the image data that corresponds to the second region, in order to generate the modified image data includes:

generating the modified image data by applying an overlay at the portion of the image data that corresponds to the second region.

23. The non-transitory computer readable storage medium of claim 21, wherein modifying the portion of the image data that corresponds to the second region, in order to generate the modified image data includes:

generating the modified image data by applying a neutral tone map to the image data.

* * * * *